United States Patent
Nelson et al.

(10) Patent No.: US 8,850,583 B1
(45) Date of Patent: Sep. 30, 2014

(54) INTRUSION DETECTION USING SECURE SIGNATURES

(71) Applicants: Trent Darnel Nelson, Ammon, ID (US); Jedediah Haile, Idaho Falls, ID (US)

(72) Inventors: Trent Darnel Nelson, Ammon, ID (US); Jedediah Haile, Idaho Falls, ID (US)

(73) Assignee: U.S. Department of Energy, Washington, DC (US)

( * ) Notice: Subject to any disclaimer, the term of this patent is extended or adjusted under 35 U.S.C. 154(b) by 65 days.

(21) Appl. No.: 13/785,349

(22) Filed: Mar. 5, 2013

(51) Int. Cl.
*H04L 29/06* (2006.01)
(52) U.S. Cl.
CPC ................... *H04L 63/1416* (2013.01)
USPC .............................. 726/23; 380/44
(58) Field of Classification Search
USPC .............................. 726/23; 380/44
See application file for complete search history.

(56) References Cited

U.S. PATENT DOCUMENTS

| | | | |
|---|---|---|---|
| 7,624,446 B1* | 11/2009 | Wilhelm | 726/23 |
| 2005/0229254 A1* | 10/2005 | Singh et al. | 726/23 |
| 2005/0240781 A1* | 10/2005 | Gassoway | 713/188 |
| 2007/0297410 A1* | 12/2007 | Yoon et al. | 370/392 |
| 2008/0077793 A1* | 3/2008 | Tan et al. | 713/168 |
| 2011/0087779 A1* | 4/2011 | Martin et al. | 709/224 |
| 2013/0191914 A1* | 7/2013 | Dubrovsky et al. | 726/22 |

* cited by examiner

*Primary Examiner* — Michael Pyzocha
(74) *Attorney, Agent, or Firm* — Michael J. Dobbs; Daniel D. Park; John T. Lucas (57) ABSTRACT

A method and device for intrusion detection using secure signatures comprising capturing network data. A search hash value, value employing at least one one-way function, is generated from the captured network data using a first hash function. The presence of a search hash value match in a secure signature table comprising search hash values and an encrypted rule is determined. After determining a search hash value match, a decryption key is generated from the captured network data using a second hash function, a hash function different form the first hash function. One or more of the encrypted rules of the secure signatures table having a hash value equal to the generated search hash value are then decrypted using the generated decryption key. The one or more decrypted secure signature rules are then processed for a match and one or more user notifications are deployed if a match is identified.

20 Claims, 2 Drawing Sheets

INTRUSION DETECTION USING SECURE SIGNATURES

GOVERNMENT INTERESTS

The United States Government has rights in this invention pursuant to Contract No. DE-AC07-05ID14517, between the U.S. Department of Energy (DOE) and the Battelle Energy Alliance.

CROSS-REFERENCE TO RELATED APPLICATIONS

1. Field of the Invention

One embodiment of the present invention relates to intrusion detection using secure signatures, preferably for industrial control software, for example SCADA (supervisory control and data acquisition) software.

2. Background of the Invention

There has been a tremendous effort in the development of intrusion detection signatures, particularly for industrial control software, for example SCADA (supervisory control and data acquisition) software. Although there has been limited success in adaptive intrusion techniques that are able to detect unknown software vulnerabilities, the majority of intrusion detection is from a list of predetermined known intrusion methods. However, when manufactures have identified a software vulnerability they are hesitant to release details on the software vulnerability, as it may enable others to exploit the software vulnerability. Even updates to a known software vulnerability may be reverse engineered thereby exposing the software vulnerability.

Software manufactures have had some success with the rapid deployment of updates, whereby the disclosure of the software vulnerability coincides with mass updates. For example, U.S. Pat. No. 7,876,902 discloses a method for rapid deployment by encrypting the update, generally too large for near instantaneous transfer to all users. Once the update has been deployed to a significant number of users, the decryption key, able to be transferred substantially instantaneously to all users, is deployed. This method leaves the software vulnerability exposed for the insignificant time that the decryption key is transferred to the time the update, which previously has been downloaded, is applied. However, this method is only effective when there is a reliable update software. Many existing software are not designed for continuous updates or not even connected to a network for updates. Furthermore, many software are not designed for automatic updates, thereby adding in a very significant amount of delay in the update process by requiring user intervention. Many manufactures are in the position of providing an update to a software vulnerability, risking the disclosure of the vulnerability to the public, or maintaining the vulnerability in secret and risking the possible exploitation of the vulnerability.

Therefore, there is a need to detect attempts to exploit software vulnerabilities, without the exposing the underlying software vulnerability. There is also a need for the distribution of signatures which can be used to detect the exploitation of vulnerable software without disclosing to the end user or a third party the content of the signatures.

SUMMARY OF THE INVENTION

A method and device for intrusion detection using secure signatures comprising capturing network data. A search hash value is generated from the captured network data using a first hash function. The search hash value employing at least one one-way function, whereby given the search hash value one cannot determine the network data. The presence of a search hash value match is determined between the generated search hash value and one or more hash values in a secure signature table. The secure table comprises one or more hash values each comprising a corresponding encrypted rule. After determining a search hash value match, a decryption key is generated from the captured network data using a second hash function. The second hash function is different from the first hash function. One or more of the encrypted rules of the secure signatures table having a hash value equal to the generated search hash value are then decrypted using the generated decryption key. The one or more decrypted secure signature rules are then processed for a match and one or more user notifications are deployed if a match is identified.

DETAILED DESCRIPTION OF THE INVENTION

A method and device for intrusion detection using secure signatures comprising capturing network data. A search hash value is generated from the captured network data using a first hash function. The search hash value employing at least one one-way function, whereby given the search hash value one cannot determine the network data. The presence of a search hash value match is determined between the generated search hash value and one or more hash values in a secure signature table. The secure table comprises one or more hash values each comprising a corresponding encrypted rule. After determining a search hash value match, a decryption key is generated from the captured network data using a second hash function. The second hash function is different from the first hash function. One or more of the encrypted rules of the secure signatures table are then decrypted using the generated decryption key. The one or more decrypted secure signature rules are then processed for a match and one or more user notifications are deployed if a match is identified. Preferably, a SCADA (supervisory control and data acquisition) system is monitored using any one of the embodiments described herein.

The secure signature table comprises one or more records, each record comprising a search hash value and a corresponding encrypted rule. Preferably, for efficient processing, the secure signature table further comprises one or more network transport parameters that are used to filter out network traffic not related to the protocol being monitored for vulnerabilities. The secure signature table is preferably provided by a manufacturer of a system described herein. The secure table is preferably generated by identifying a software vulnerability. A software vulnerability is any means of manipulating computer software in a way unintended by the designs of the software, particularly to gain access to unintended functionality or functionality not intended for the user accessing the system. Examples of software vulnerabilities include, but are not limited to, Memory Misuse (e.g. buffer overflow, dangling pointers), input validation errors (e.g. format string attacks, code injection, SQL injection, http header or response injection, etc.), race conditions, privilege confusion, privilege escalation, etc. Once a software vulnerability is identified, one skilled in the art identifies a vulnerability signature of network data containing the exploit, preferably tailoring the network data to identified possible variations. For example, if there is a known vulnerability in passing non-ascii characters as part of a login data structure, the vulnerability signature would be tailored to match the login data structure on the applicable network port going to the vulnerable device. A rule is then constructed to positively identify the software vulnerability. For example, the detection of an invalid ascii character within the login data structure identified by the vulnerability signature. Preferably, each of these rules is a secured against analysis by third parties or end users. The vulnerability signature can then be used to quickly screen network data, allowing rules, which are much slower to process, to be processed only when a vulnerability is identified as a signature match.

Once a vulnerability has been identified and a signature and corresponding rule have been identified, a searching hash value is generated from the vulnerability signature. The corresponding rule of the signature is then encrypted using a means whereby the decryption of the rule may be accomplished by the generated decryption key described herein.

FIG. 1

Figure 1:
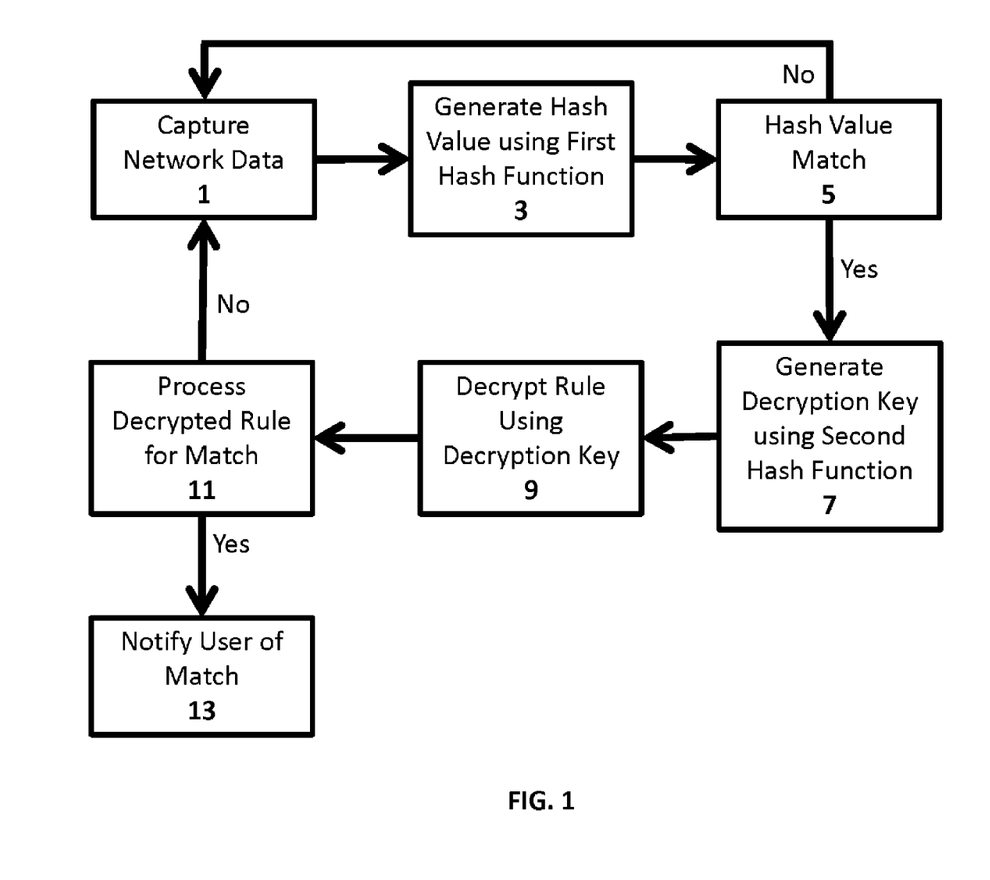
FIG. 1 depicts a flowchart of a preferred embodiment of a method for intrusion detection using secure signatures.

FIG. 1 depicts a flowchart of a preferred embodiment of a method for intrusion detection using secure signatures comprising the method starting with the capture of network data 1, which preferably comprises capturing each data packet, data session, a plurality of network packets, or a combination thereof. A search hash value 3 is generated from the captured network data. The generated search hash value is then compared against a secure signature table for a match 5. If a match between the generated search hash value is not found in the secure signature table, the process returns to the capture of network data 1. If a match between the generated search hash value is found in the secure signature table, the process continues with the generation of a decryption key from the captured network data using a second hash function 7. The second hash function is a different hash function from the first hash function. The generated decryption key from step 7 is then used to decrypt a rule identified by the search hash value 9. The decrypted rule is processed 11 and if a match is detected, the user is notified 13. If there is no match after the decrypted rule is processed 11, the process returns to the capture of network data 1.

In a preferred embodiment, the process depicted in FIG. 1 is implemented whereby the system processes multiple steps simultaneously. For example, preferably, the capture of network data 1 is executed by a capture device, for example the capture device 23 of FIG. 2, while the remaining steps are processed by any number of processors. In one preferred embodiment, one or more of the steps in FIG. 1 are performed by a separate device, processor or thread.

Capturing One or More Network Data 1

The step of capturing network data 1 comprises any means of capturing network data including, but not limited to, a plurality of packets, network session data, etc. Preferably, each bit of the network data is captured and processed using the method described herein. In a preferred embodiment, each single packet is processed as captured network data using the method described herein, followed by a plurality of packets processed as captured network data using the method described herein, and then the network session data is processed as captured network data using the method described herein.

Network data is preferably captured using a network interface card (NIC), virtual network interface or other interface, bus, etc. A network packet is a formatted unit of data carried by a packet mode computer network, for example IP (Internet Protocol). Network session data is data compiled from combining one or more packets to form the data originally sent, thereby removing the various encapsulations in each transport layers, for example IP headers, TCP headers, UDP headers, etc.

In one embodiment, a network data capture device is configured to capture only specific network packets further processing using the method described herein, for example, in a preferred embodiment, only network traffic originating from or to network devices of interest, preferably industrial control software, data servers, etc. is processed using the method described herein. In yet another embodiment, network data is filtered, or further filtered, using specific data protocols, for example telnet, http, SSH, proprietary protocols, etc., or using specific data ports, for example TCP port, UDP port, session state, etc. In a preferred embodiment, a software package is used to initially process and filter the network data of interest, more preferably combining one or more packets forming session data for processing. In a preferred embodiment, the software package SNORT by SOURCEFIRE INC., is used to filter the network data of interest, form a plurality of packets into network session data, process decrypted rules, or a combination thereof.

Preferably, the captured network data is data received with the removal of any transport layers, for example IP and TCP/UDP, resulting in only the payload data. Preferably, the data is passed through the search hash function starting with the first bit and subsequently altering the bit offset value by one. Therefore, the hash function would receive data starting with the first bit then data starting with the second bit until all bits are reviewed. Preferably, all session packets are ordered in their proper order and the payload is aggregated using this altering the bit offset value. Preferably, the amount of data passed through the hash function is optimized by efficiency. In a preferred embodiment, the capturing network data is each of a single network packet, a plurality of network packets, and at least part of a protocol session.

A protocol session is all of the data passed to a service, without encapsulation from for example, IP, TCP/UDP, using a predefined network protocol. In one embodiment, the protocol session is HTTP, HTTPS, FTP, Telnet, SSH, or a proprietary protocol defined by a vender. In a preferred embodiment, the capturing network data is a plurality of network packets forming at least part of a protocol session.

Generating One or More Search Hash Values 3

The step of generating a search hash value 3 comprises generating a search hash value from the network data using a first hash function. The network data is the network data captured data from step 1. The first hash function is any algorithm or subroutine that maps at least part of the captured data to a fixed data length. The first hash function is a one-way function, whereby given the search hash value one cannot determine the network data.

In one exemplary embodiment of a first hash function, the search hash value is simply each byte within the secure signature numerically added. Preferably, a more efficient hashing algorithm is used, preferably optimized for the signature data. The first hash function preferably comprises a RS, JS, PJW, ELF, BKDR, SDBM, DJB, DEK, AP hash functions, MD4, MD5, SHA-1, SHA-2, etc., or combinations thereof.

Preferably, the first hash function is designed to produce false positives thereby hardening the secure signatures against reverse engineering. Preferably, the first hash function is a bloom filter. In one embodiment, one or more canary rules are added to the secure signature table, whereby the software is designed to take protective measures, such as locking the secure signature system, or deleting the secure signature table. A canary rule is a rule that is not related to a known vulnerability. The canary rules are rules that would not be seen during normal network traffic, but only during a brute force attack. The addition of canary rules is preferably used in embodiments using a bloom hash function, which is particularly suitable for creating false positives, thereby confusing brute force attacks. Preferably, canary rules are added perform various actions in response to the brute attach, preferably locking the system, deleting all rules, notifying a party, or any combination thereof.

In one embodiment, a seed unique to the user is added to the data passed to the captured data. A seed unique to the user is data associated with the user, for example a userid, name, account number or other identifier. This unique seed may be used construct rules unique to the user. This may help identify leaks or reverse engineering attempts as the extracted rules may be used to identify the associated user.

Determining the Presence of a Search Hash Value Match 5

The step of determining the presence of a search hash value match comprises determining the presence of a search hash value match between the generated search hash value and one or more hash values in a secure signature table, preferably using a bloom filter.

In a preferred embodiment, the first hash function is a bloom filter. Preferably, the bloom filter uses a plurality of hash functions to generate a single bloom value by combining. For example, in one embodiment, the secure signature is passed through a plurality of hash functions, H1, H2, H3. Each output of H1, H2, and H3 are then combined together in using a Boolean or function to generate the search hash value. For example, if H1 generates 15 and H2 generates 6 and H3 generates 3, bits 3, 6 and 15 may be set in an array of bits resulting in a binary search hash value of 0001001000000001 (32,840 or 0X8048).

A secure signature table comprising a list of hashes and encrypted rules is provided. Preferably, the secure signature table is further protected using an encrypted file partition and other hardware protective measures or encryption. The secure signature table is generated by running the unsecured vulnerability signature through the first hash function and encrypting the rule. Preferably, the signature table contains one or more decoy signatures, preferably comprising one or more identifiable watermarks used to confuse attackers.

Preferably, if no matches found, any decrypted secure signature rules are deleted, preferably immediately after finding no corresponding match. Rules are preferably deleted by unallocating memory, more preferably by changing the contents of the memory containing the decrypted secure signature, for example with random data or a predefined dataset (e.g. all 0s or 1s). Preferably, the technique employed to deleted any decrypted secure signature rules are optimized for maximum security and protection against capture.

Generating a Decryption Key Using the Captured Network Data 7

In the step of generating a decryption key using the captured network data, the decryption key is generated from the captured network data. The decryption key is generated using a second hash function on the captured network data. The second hash function is a function different from the first function, as the value of the first hash function will be stored with the encrypted rule.

The second hash function is a one-way function, whereby given the search hash value one cannot determine the network data. In one exemplary embodiment of a first hash function, the search hash value is simply each byte within the secure signature numerically added. Preferably, a more efficient hashing algorithm is used, preferably optimized for the signature data. The first hash function preferably comprises a RS, JS, PJW, ELF, BKDR, SDBM, DJB, DEK, AP hash functions, MD4, MD5, SHA-1, SHA-2, etc., or combinations thereof.

Decrypting One or More Encrypted Rules Using the Decryption Key 9

The step of decrypting one or more encrypted rules of the secure signatures table comprises decrypting one or more encrypted rules of the secure signature table having a hash value corresponding to the generated search hash value. Therefore, the one or more encrypted rules in the signature table cannot be decrypted unless the corresponding captured data is known. Once a matching search hash value is found, the encrypted rule may be decrypted using the generating a decryption key. The rule is encrypted using two-way function whereby using a key one may encrypt data and then subsequently get the data back after decrypting the encrypted data with the decryption key, preferably the same key as the encryption key. The generated decryption key is used to decrypt the corresponding one or more rules in the signature table having a hash value corresponding to the generated search hash value. Preferably, the encrypted rule is encrypted using an AES encryption and the step of decrypting the rule comprises an AES decryption function.

Processing the One or More Decrypted Secure Signature Rules for a Match 11

The step of processing the one or more decrypted secure signature rules for a match 11 comprises processing each decrypted secure signature rule using a processor. The processor is any electronic, mechanical or combination thereof means of processing the decrypted rule. In a preferred embodiment, the processor is a computer, microcontroller, ASIC (Application Specific Integrated Circuit), etc., or combination thereof.

Preferably, various network encapsulation information is used in processing the decrypted secure signature rule. Preferably, the various network encapsulation information includes any one or more of IP address, port number, session state, etc. In one embodiment, the decrypted secure signature rule parses the captured network data using the specifications for the given protocol of the captured data. If the captured network data fails to meet the requirements of the given protocol, then the decrypted secure signature rule is considered matched. In another embodiment, although the captured network data may meet the requirements of the given protocol, the captured data may include one or more commands, malformed data, etc. that may trigger a match. For example, a malformed command or data send using a particular protocol may be maliciously used to exploit a vulnerability. The decrypted secure signature rule may use various pattern matching techniques to find such malicious code.

In a preferred embodiment, the decrypted secure signature rule is computer software (machine, byte-code, interpreted code, etc.) written to perform one or more transformations, calculations, and conditional logic in order to determine the presence of a match. In one embodiment, the decrypted secure signature rule is machine code, byte-code, or code to be executed using an interpreter that is processed by a processor. In this embodiment, the code in the decrypted rule ends returning a response indicating whether or not a match was found. Preferably, in this embodiment, the processor running the decrypted rule has access (e.g. registers, passed arguments, memory access, etc.) to the captured data, timestamps, and various network encapsulation information or a combination thereof.

In embodiments whereby the decrypted secure signature rule comprises computer software, the decrypted secure signature rule preferably comprises verification data used to verify the validity of the computer software. For example, if a false match is identified, an invalid decryption key will be generated resulting in corrupt computer software that may be undesirable to run. Therefore, preferably verification data is prepended, postponed, or a combination thereof to the computer software. In an alternate embodiment, a predetermined structure may be used to store the computer code in various packets, blocks, sectors, etc. for later verification and retrieval. In a one embodiment, a search hash value is generated from the captured data, decryption key, search hash value, computer software or a combination thereof is used as the verification data. In a preferred embodiment, the decryption key is used as the verification data. In yet another preferred embodiment, the verification data is an MD5 checksum of the captured data, computer software or combination thereof.

In an alternate embodiment, the decrypted secure signature rule is a list of parameters, which may individually or in any combination trigger a match. For example, the decrypted rule may contain a dictionary of commands or data formats that trigger a match. In one embodiment, a particular command that is generally unused is set to trigger a match. In another embodiment, the decrypted rule contains a regular expression that is used to test a command or data as descried in by the protocol of the captured network data.

Notifying a User of a Match 13

The step of notifying a user of a match upon the detection of a match from the decrypted rule 13, comprises any method of notifying the user, preferably electronic, visual, audible, tactical. In a preferred embodiment, the software sends an electronic signal to an internet connected device for an electronic alert, for example email, text message, etc. to be sent to a predetermined user. In a preferred embodiment, the decrypted rule contains contact information and a vulnerability identification code for the user to contact the manufacturer or knowledgeable security representative. In another preferred embodiment, the software notifies the manufacturer of the matching rule, preferably sending information regarding the vulnerability and a unique customer identifier, for example a product serial number.

FIG. 2

Figure 2:
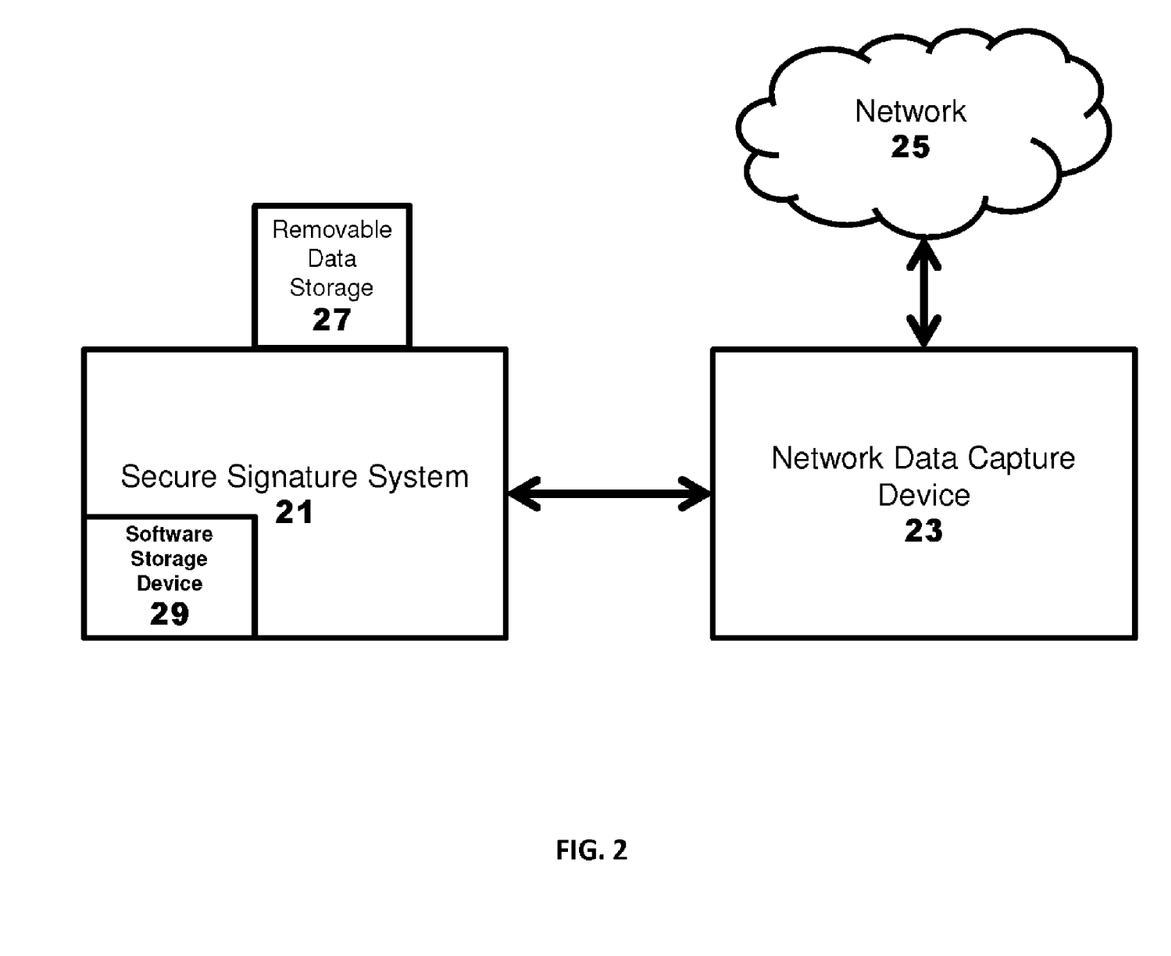
FIG. 2 depicts an embodiment of device for intrusion detection using secure signatures.

FIG. 2 depicts an embodiment of device for intrusion detection using secure signatures comprising a secure signature system 21 connected to a network data capture device 23, connected to a network 25.

The secure signature system 21 is any device capable of performing the process described above. Preferably, the secure signature device comprises a computer, CPU, ASIC (Application Specific Integrated Circuit), Microprocessor, etc, or any electronic, mechanical, or combination thereof means for performing the above identified functions. Preferably, the secure signature system 21 has additional security features, for example a tamperproof case, hardware encryption a trusted platform module (TPM), or any combination thereof. In a preferred embodiment, the secure signature system 21 comprises a C7 CPU as manufactured by VIA is used as it incorporates hardware encryption technologies, in addition to a low power design. In another preferred embodiment, the secure signature system 21 comprises a trusted platform module (TPM) is used to provide hard encryption, decryption, hashing and secure key storage.

Preferably, the secure signature system 21 comprises a removable data storage 27 software, whereby secure signatures may be updated by the replacement of the removable storage. The removable data storage 27 is any one or plurality of devices capable of digitally storing data, preferably, magnetic media, flash media, ROM (Read Only Memory), RAM (Random Access Memory), etc. Preferably, the removable data storage 27 is a non-volatile storage device, whereby the data is retained when the device is reset, powered down etc. Preferably, the removable storage 27 is a secure device capable of encrypting data via software or more preferably hardware, for example the IRONKEY thumb drive as manufactured by IMATION. Preferably, the removable storage is bound to a particular secure signature system unit, for example by encrypting the data on the removable data storage with a unique key only used by a particular secure signature system unit, preferably using a Trusted Platform Module (TPM).

The secure signature system 21 further comprises a software storage device 29. The software storage device 29 is any one or a plurality of devices capable of digitally storing data, preferably, magnetic media, flash media, ROM (Read Only Memory), RAM (Random Access Memory), etc. In one embodiment, the software storage device 29 is a volatile storage technology, whereby the data is downloaded, or copied from a secure location when the device initializes. In a preferred embodiment, the software storage device 29 is a non-volatile storage device, whereby the data is retained when the device is reset, powered down etc. The software storage device 29 comprises computer software written to implements the method of intrusion detection using secure signatures as described above.

The Network Data Capture Device 23

The network data capture device 23 is any device capable of capturing network data. In a preferred embodiment, the network data capture device 23 is a virtual machine, computer, microcontroller, ASIC (Application Specific Integrated Circuit), etc., or combination thereof, having access to network data, preferably via a hardware or virtual network interface card (NIC). In a preferred embodiment, the network data capture device 23 uses the software package SNORT by SOURCEFIRE INC., to filter the network data of interest, form a plurality of packets into network session data, process decrypted rules, or a combination thereof.

Example 1

In one exemplary embodiment, one or more vulnerabilities are identified and a corresponding vulnerability signatures and rule are generated. Each vulnerability signature is passed through a first hash function preferably utilizing a bloom function generated a search hash value, in a secure signature table. Each vulnerability signature is also passed through a second hash function, preferably a SHA function, generating a decryption key. Each rule corresponding to each signature is then encrypted, preferably using an AES encryption, using the corresponding decryption key. Each resulting encrypted rule is then saved in a second row with the corresponding encrypted signature in the secure signature table.

Preferably, the secure signature table is deployed on a removable storage device, as described above. At the user site, the provided removable storage device is connected to the secure signature system. Preferably the secure signature system is connected to a network capture device, as described above. Preferably, the network capture device is configured to filter only network data of interest, preferably by protocol, network port, source of the network data, destination of the network data, session state, or a combination thereof. Preferably, the network capture device uses the SNORT by SOURCEFIRE INC software package.

Network data captured by the network capture device is then communicated to the secure signature system. The network data is then passed through a first hash function, preferably a bloom function resulting in a search hash value. The first column of the secure signature table is then searched for the search hash value. If a match is found, the decryption key is then calculated by passing the network data through a second hash function, preferably an SHA function. Once the decryption key has been calculated, the corresponding encrypted rule in the secure signature table is then decrypted using the corresponding description method the rule was encrypted with, preferably AES, the decryption key. Finally, the decrypted rule is then processed by the secure signature system and if a match is found the user is notified, as described above.

Example 2

In one embodiment, a secure signature device is a small computer in a secured tamper responding enclosure which has 2 USB interfaces and a USB transport cord. The end user supplies a network tap which will feed raw network data to the secure signature device via the USB transport cord. The USB transport cord is also used to send messages such as systems status and secure signature alerts back to the network tap. Preferably, a reference network tap running on commodity PC hardware running some variation of Unix (Linux, Freebsd, OSX, Solaris, etc), is used by end users as a drop in network tap for use with the secure signature device.

Preferably, the system is designed to isolate the secure signature device as completely as possible from attack. The hardware is preferably designed to resist and respond to any attempt to open the device. The software stack interfacing with the USB transport cord is preferably a message based protocol which only responds to a small set of specific commands. There is preferably no network stack, no video, no keyboard or other 10 interfaces supported.

Each secure signature device preferably ships with a Trusted Platform Module (TPM) which is a secure computing chip which provides for secure crypto operations and secure storage of crypto keys. At rest data storage is preferably provided by a self-encrypting drive which uses hardware encryption on the hard drive itself. The TPM stores the keys for the-self encrypting drive. The hardware enclosure is preferably designed to erase the TPM if the enclosure is opened, effectively locking the hard drive.

In one embodiment, the secure signature device runs a carefully secured LINUX operating system which has had all support for IO devices other than the USB transport cord and USB keys removed from the kernel. Any kernel used preferably has all debugging support disabled, module support has been removed, and all security options set to their most secure setting. Preferably, full privilege separation is implemented at every level of the system. The USB transport interface preferably runs as a separate unprivileged process which is distinct from the process which runs the Secured Signature software. Each process preferably has specific limited permissions which only allow access to a specific part of the file system. Preferably, a separate watchdog process exists whose sole task is to ensure that the USB transport interface and the Secure Signature processes are running as designed.

At boot time the boot loader preferably interacts with the TPM to ensure that the operating system has not been modified, if this check is successful then the system boots. Otherwise the secure signature device will preferably not boot. Preferably, an integrity check failure will result in the TPM being locked.

Preferably, the system performs the following workflow:
1. Raw network data arrives from the network tap system via the USB transport interface on the secure signature device.
2. Raw network data is sent directly to the secure signature software.
3. The secure signature software examines the network data for packet header and payload matches against a set of bloom filters which encapsulate all the header and content combinations which are of interest.
4. If a match is found, then an encrypted executable module is decrypted using an md5 sum of the matching content. The decrypted executable module does further inspection of the related network data. It returns an indication of success or failure to the secure signature process, and the decrypted module is immediately wiped from memory.
5. If there is a successful match returned, then a message containing an alert identification number, a message telling the end user what steps to take next, and an encrypted copy of the relevant network data is sent back to the network tap system where the end user will be alerted.
6. Repeat steps 1-5 indefinitely Preferably, each secure signature is broken into 4 parts:
1. Packet header parameters. Any part of a packet header can be included here as part of the search criteria, source IP address, destination IP address, protocol, flags, source port, destination port, etc.
2. Packet payload content. The content of the payload can be searched for any sequence of bits or bytes, at any offset or multiple offsets. A single signature can have multiple content searches.
3. Hash algorithm polynomials, represented as 64 bit integers. A set of 64 bit integers which is used to seed a rabin fingerprint generator. Each 64 bit polynomial can be used to create a unique hash algorithm via the rabin fingerprint generator. The number of polynomials included depends on the contents of 1 & 2 above. This 64 bit space gives us an extremely large number of possible hash functions. Note that the combination of these integers will be unique for each rule and for each user, allowing every single rule to be fingerprinted to a specific end user if so desired.
4. An AES encrypted binary module whose key is a SHA sum of the matching content from 1 & 2 above. The binary module can do any operation on the network data that is desired by the author of the rule. Preferably, the binary is compiled C code.

A set of Secure Signatures are composed of any number of rules as described above. These rules are preferably compiled into a set of secure signatures as follows.

A. Header Categorizing Bloom Filter. All the packet header parameters from the complete set of secure signatures are packed into a categorizing bloom filter. This categorizing bloom filter will return a match category when matching packet headers are found. The match categories allow the secure signature system to know which Content Categorizing Bloom Filter to use for subsequent analysis.
   a. 64 bit integers for the rabin hash algorithms are included here also B. Content Categorizing Bloom filters. A set of categorizing bloom filters are constructed from all the signatures' payload search criteria, the number and specifics of these bloom filters are dependent on the search criteria of the entire rule set. Each Content Categorizing Bloom Filter will return a category upon match which allows the correct encrypted executable module to be loaded and executed.
   a. 64 bit integers for the rabin hash algorithms are included here also C. Content category to encrypted executable module mapping. This maps the categories returned from a match in B to the correct encrypted executable module(s). This is implemented as a specialized bloom filter as well, to obscure the relationship between content matches and which executable modules will be executed upon successful match.

When A & B return successful matches, then the matching data from the raw network data are sha256 hashed to provide a decryption key, the category result from B is used to find the correct executable module(s) using mapping C. The encrypted module(s) are then preferably decrypted, executed, and wiped from memory as described in section Workflow above.

Preferably, the one or more canary rules, rules that do not relate to a known vulnerability, are added to the table. The only way to extract the content of a bloom filter is to run data through it in a brute force attack, noting matches as they occur. The number of false positives produced by a given bloom filter are preferably tuned by various parameters used in constructing the bloom filter. Preferably the false positive rate is tuned to give an opportunity to enumerate the possible false positive data combinations, and then produce encrypted executable modules which can take action when it becomes apparent the secure signature rule set is being brute forced. These actions could include locking the TPM, or deleting protected data such as rule sets.

Each secure signature device preferably has a unique TPM. The TPM preferably produces a public PGP key, which can be used by third parties to PGP encrypt data which can only be decrypted by the TPM which issued the public PGP key.

Preferably when rules are produced, the rule producer can take each end user's public PGP key, encrypt the rule package for the specific secure signature device and sign it using the producer's own PGP key. These packages are then preferably distributed to the end users, who can install the new signatures using the network tap system or via a USB thumb drive.

When the secure signature device receives a new rule package, it first preferably checks the PGP signature to ensure the package came from a trusted party and that it arrived unaltered. If that check is successful then the TPM on the device preferably decrypts the new rules and they are installed.

Example Secure Signature Table

In one embodiment, the secure signature table is a SNORT configuration file adapted for handling the unique hash value matching and encrypted rules described herein. In one embodiment, a single rule has the form:
   alert tcp $EXTERNAL_NET $HTTP_PORTS→$HOME_NET any (msg:"Exploit Signature Sample"; flow:to_clientestablished; hash_function:"$HASH_FUNCTION1"; hash_table: "$HASH_TABLE1"; encrypted_rule:"$ENCRYPTED_RULE1")

As shown, the rule tells SNORT to look for packets coming from an external network from a HTTP port, going into the home network, with an established TCP session. The rule is looking for data going to the client, not to the HTTP server. Any particular port, flow, source or destinations may be used. The other parameters are as follows:

hash_function:"$HASH_FUNCTION1" describes the first hash function used in generating a search hash value from said captured network data. For performance concerns, this hash value is only calculated on captured data matching the ip and tcp data defined in the rule, in this case HTTP port going into the home network with an established TCP session. As known in the art, the $HASH_FUNCTION1 represents a variable linking to data that is machine code or to be interpreted into machine code.

hash_table:"$HASH_TABLE1"; describes the hash table used to determine a search hash value match between the generated search hash value and one or more hash values in the $HASH_TABLE1 data. The $HASH_TABLE1 represents a variable linking to data that is the table, preferably within some form of predefined structure, machine code or to be interpreted into machine code.

encrypted_rule:"$ENCRYPTED_RULE1" describes the hash table used to determine if a secure signature is identified. As discussed above, after determining a search hash value match, a decryption key is generated from said captured network data using a second hash function rule. The encrypted rule is decrypted using the generated decryption key. Each decrypted secure signature rule is then processed for a match and if a match is detected, the user is notified. The :"$ENCRYPTED_RULE1 represents a variable linking to data that is the table, preferably within some form of predefined structure, machine code or to be interpreted into machine code.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. §112, ¶6.

In particular, the use of "step of" in the claims herein is not intended to invoke the provisions of 35 U.S.C. §112., ¶ 6.

The invention claimed is:

1. A method for the secure detection of signatures comprising:
   a. capturing network data;
   b. generating a search hash value from said captured network data using a first hash function; said search hash value employing at least one one-way function, whereby given the search hash value one cannot determine the network data;
   c. determining the presence of a hash value match between said generated search hash value and one or more hash values in a secure signature table; said secure table comprising one or more hash values each comprising at least one corresponding encrypted rule;
   d. after determining a search hash value match, generating a decryption key from said captured network data using a second hash function; said second hash function different from said first hash function;
   e. decrypting one or more said encrypted rules of said secure signatures table having a corresponding hash value equal to said generated search hash value using said generated decryption key;
   f. processing each said decrypted secure signature rule for a match, and if a match is detected, deploying one or more user notifications; and
   g. said steps performed by one or more processors.

2. The method for the secure detection of signatures of claim 1 further comprising:
   a. deleting each said decrypted secure signature rules immediately after finding no corresponding match.

3. The method for the secure detection of signatures of claim 1 whereby said step of capturing network data consists of capturing each of a single network packet, a plurality of network packets, and at least part of a protocol session.

4. The method for the secure detection of signatures of claim 1 whereby said step of capturing network data consists of capturing a plurality of network packets.

5. The method for the secure detection of signatures of claim 1 whereby said step of capturing network data consists of capturing a single packet.

6. The method for the secure detection of signatures of claim 1 whereby said step of capturing network data consists of capturing a plurality of network packets forming at least part of a protocol session.

7. The method for the secure detection of signatures of claim 3 further comprising:
   a. said step of passing said network data into a first hash function generating a search hash value comprising:
      i. passing a part of said generated networking data into a first hash function generating a search hash value with alternating bit offset values.

8. The method for the secure detection of signatures of claim 1 whereby said step of processing said one or more decrypted secure signature rules for a match comprises:
   a. calculating a verification data for said search hash value match;
   b. checking for the presence of said calculated verification data within one or more predetermined locations of said one or more decrypted secure signature rules; and
   c. upon determination of the presence of said calculated verification data within said one or more predetermined locations of said one or more decrypted secure signature rules, processing said one or more decrypted secure signature rules.

9. The method for the secure detection of signatures of claim 8 whereby:
   a. said one or more predetermined locations is the beginning and ending of said one or more decrypted secure signature rules; and
   b. said step of calculating a verification data value for said hash value match comprises calculating an MD5 checksum.

10. The method for the secure detection of signatures of claim 1 further comprising:
    a. generating a secure signature table comprising search hash values and an encrypted rule comprising:
       i. determining a networking vulnerability;
       ii. determining one or more networking signatures corresponding to said determined networking vulnerability;
       iii. generating a search hash value for said each said determined one or more networking signatures using said first hash function;
       iv. providing a rule used to determine the presence of said networking vulnerability for each generated search hash value; and
       v. encrypting said determined rule for each said generated search hash value thereby generating an encrypted rule for each corresponding search hash value.

11. The method for the secure detection of signatures of claim 10 whereby said step of generating a secure signature table comprising further comprises the creation of one or more cannery rules.

12. The method for the secure detection of signatures of claim 1 whereby said step of generating a search hash value comprises using a seed unique to the user.

13. The method for the secure detection of signatures of claim 1 whereby said one or more processors is a computer, microcontroller, ASIC (Application Specific Integrated Circuit), or combination thereof.

14. The method for the secure detection of signatures of claim 2 whereby said step of capturing network data comprises capturing a plurality of network packets forming at least part of a protocol session.

15. The method for the secure detection of signatures of claim 14 whereby said step of processing said one or more decrypted secure signature rules for a match comprises:
    a. calculating a verification data for said search hash value match;
    b. checking for the presence of said calculated verification data within one or more predetermined locations of said one or more decrypted secure signature rules; and
    c. upon determination of the presence of said calculated verification data within said one or more predetermined locations of said one or more decrypted secure signature rules, processing said one or more decrypted secure signature rules.

16. The method for the secure detection of signatures of claim 15 further comprising:
    a. generating a secure signature table comprising search hash values and an encrypted rule comprising:
       i. determining a networking vulnerability;
       ii. determining one or more networking signatures corresponding to said determined networking vulnerability;
       iii. generating a search hash value for said each said determined one or more networking signatures using said first hash function;

iv. providing a rule used to determine the presence of said networking vulnerability for each generated search hash value; and v. encrypting said determined rule for each said generated search hash value thereby generating an encrypted rule for each corresponding search hash value.

17. The method for the secure detection of signatures of claim 16 whereby said step of generating a secure signature table comprising further comprises the creation of one or more cannery rules.

18. The method for the secure detection of signatures of claim 17 whereby:

a. said one or more predetermined locations is the beginning and ending of said one or more decrypted secure signature rules; and b. said step of calculating a verification data value for said hash value match comprises calculating an MD5 checksum.

19. The method for the secure detection of signatures of claim 18 whereby said one or more processors is a computer, microcontroller, ASIC (Application Specific Integrated Circuit), or combination thereof.

20. The method for the secure detection of signatures of claim 19 whereby said step of generating a search hash value comprises using a seed unique to the user.

\* \* \* \* \*